April 18, 1967  G. C. TRABUE  3,315,061
HIGH FREQUENCY HEATING SYSTEM
Filed April 29, 1963  2 Sheets-Sheet 1
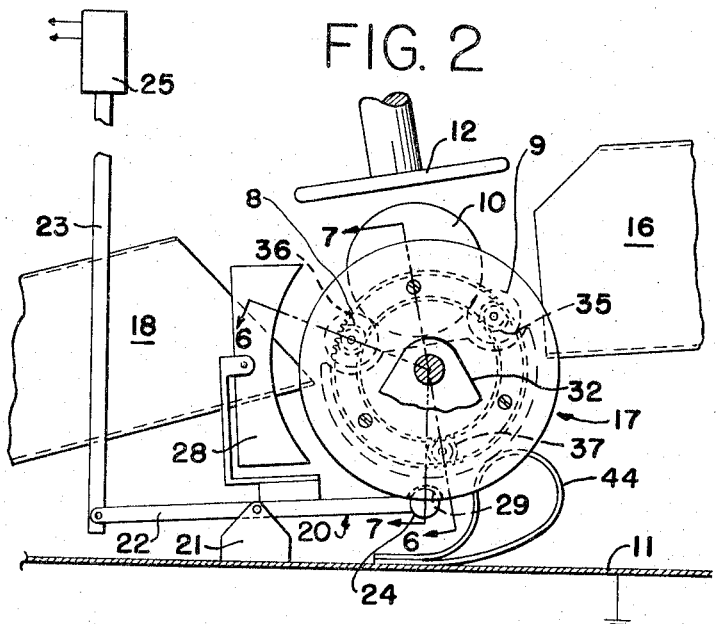
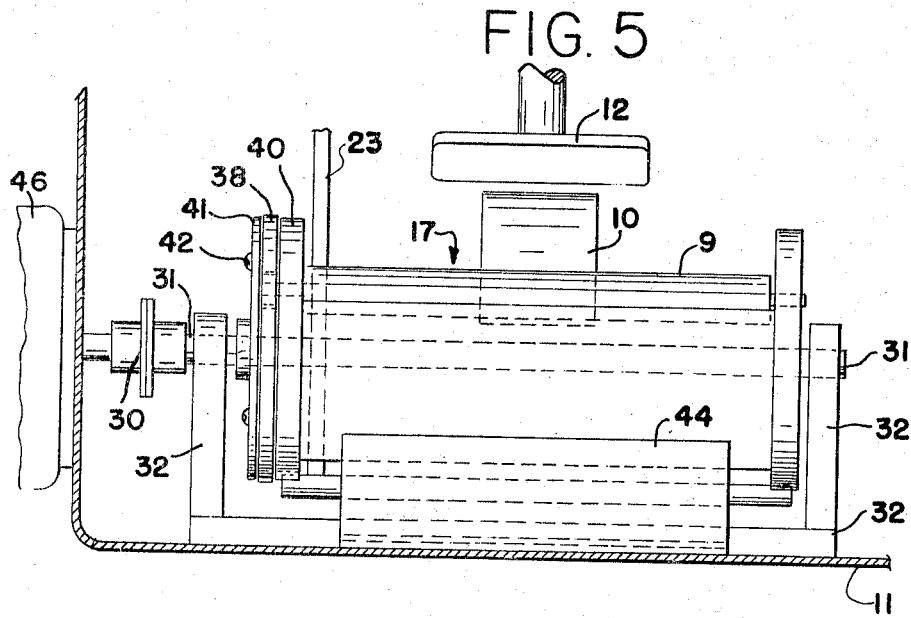
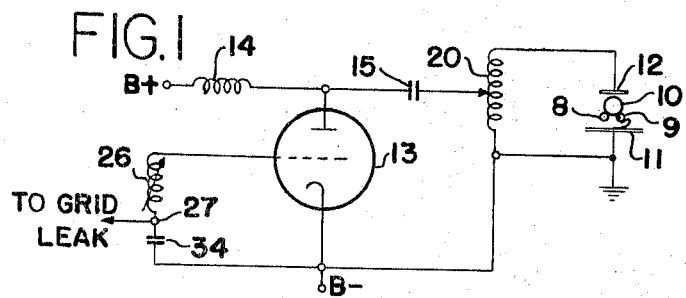
INVENTOR.
GORDON C. TRABUE
BY
ATTORNEY

INVENTOR.
GORDON C. TRABUE

BY

ATTORNEY

United States Patent Office 3,315,061
Patented Apr. 18, 1967

3,315,061
HIGH FREQUENCY HEATING SYSTEM
Gordon C. Trabue, Louisville, Ky., assignor to Chemetron Corporation, Chicago, Ill., a corporation of Delaware
Filed Apr. 29, 1963, Ser. No. 276,448
6 Claims. (Cl. 219—10.69)

This invention relates to high frequency heating, and more particularly to a system for high frequency dielectric heating.

The present invention provides an improved and automated system for carrying out the method for heating cylindrical dielectric objects in a high frequency field disclosed in the copending patent application of Boyd R. Hopkins, assigned to the same assignee as the present invention.

It is an object of the present invention to provide improved structure for conveying round dielectric objects into a high frequency heating field, for rotating the dielectric objects continuously while they are being heated in a dielectric field, and for conveying the dielectric objects away from the dielectric field at the completion of the heating cycle.

Another object is to provide an improved system for handling and heating round dielectric objects such as plastic preforms for molding operations.

A further object is to provide improved structure for quickly and uniformly heating circular dielectric objects.

Briefly stated, in accord with the illustrated embodiments of the present invention, there is provided a movable carrier adapted to receive a round dielectric object such as a cylindrical plastic preform from intake means such as a chute attached to a means containing a supply of preforms, and to convey the preform into heating position in a high frequency field between a pair of spaced electrodes. The carrier is provided with a pair of rollers for supporting the peripheral edge of the preform, and drive means for driving the rollers during the heating cycle so that the preform is continuously turned about its axis during the heating cycle. As a result all parts of the preform are quickly and uniformly heated despite distortion of the field by the preform. A clutch is provided for actuating mechanical conveying of the heated preform out of the high frequency field into a discharge chute at the end of the heating cycle.

The invention, both as to its organization and method of operation, together with further objects and advantages, will best be understood by reference to the following description taken in connection with the accompanying drawing in which:

FIG. 1 diagrammatically shows a dielectric heating system including means for rotating round objects undergoing heating in accordance with the invention;

FIG. 2 is an elevation view of a portion of the system of the present invention, partially in broken line and partially broken away for clarity, showing a round object in heating position;

FIG. 5 is a side elevation view showing a portion of the structure of FIG. 2;

Figure 3:
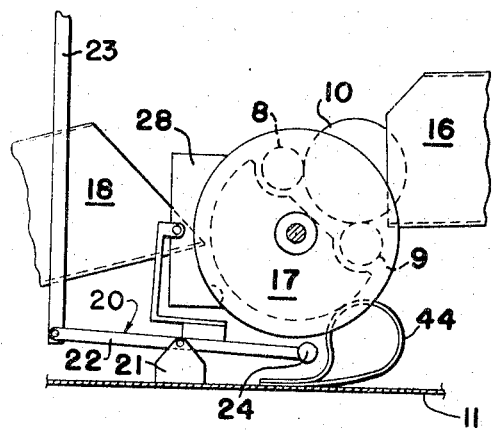
FIG. 3 is an elevation view, similar to FIG. 2, showing a round object being conveyed into heating position.

Referring now to the drawing, and particularly to FIG. 1, the invention in one form has been shown as it is employed in a high frequency dielectric heating system utilized for elevating the temperature of a cylindrical dielectric load or work piece 10 such as a plastic preform, carried by a pair of rollers 8 and 9, mounted above an earthed or grounded electrode 11. Above the dielectric load 10 is a second electrode 12.

The source of high frequency power, which may be taken as representative of typical power generators, includes a power tube 13 of the thermionic type having the customary electrodes therein, which has an anode circuit including a source of anode current whose positive and negative terminals have been identified as B+ and B—. A radio frequency choke coil 14 is included in the direct-current anode circuit and the high-frequency output of the tube 13 is fed by way of a capacitor 15 to a tank coil 20 having one end thereof connected to the electrode 12 and the other end connected to ground.

The grid circuit includes a variable inductance coil 26 having one end connected to a junction point 27, which is connected, in turn, to the grid leak, and to a by-pass condenser 34 connected to the ground.

The cathode is connected to B—. Although not shown for simplicity, it will be understood that the circuit may also include suitable protective devices such as an overcurrent relay, and suitable switching devices and metering equipment.

Referring now to FIG. 2, the preferred illustrated embodiment of the invention shown therein is constructed to handle materials that are essentially round or circular in shape, specifically, objects that are cylindrical or spherical in shape since the operation of the illustrated structure requires that the object to be handled and heated be capable of rotation around one of its axes. One such dielectric material for which the present invention is adapted for use is the cylindrical plastic preforms widely used in the plastic molding industry. However, it will be recognized that the invention has advantages not limited to the handling of cylindrical plastic. The dielectric load 10, in the form of a cylindrical plastic preform, is conveyed into the high frequency heating field from a suitable means for holding a supply of plastic preforms, not shown, via a chute 16 which may be inclined to facilitate preform feed, formed of sheet metal or other suitable material, which is sized as to width and height so that the preform is delivered into the heating zone between the electrodes only while on edge with its axis oriented parallel to the axis of the electrodes. The dielectric objects are moved laterally with respect to the electrodes 11 and 12 by means of a carrier 17, on which are mounted the rollers 8 and 9.

The carrier 17 is rotatable about a shaft 31 carrying it so that it may be properly positioned to receive from chute 16 a preform 10, to carry it into the high frequency field, as shown in FIG. 3. The carrier 17 then rotates into heating position with the preform 10 directly beneath the electrode 12 for the heating cycle as shown in FIG. 2. After the heating cycle the carrier 17 then rotates to deliver the now heated preform to an inclined chute 18 as shown in FIG. 4 for transfer to the next operation, for example, a molding operation.

Figure 4:
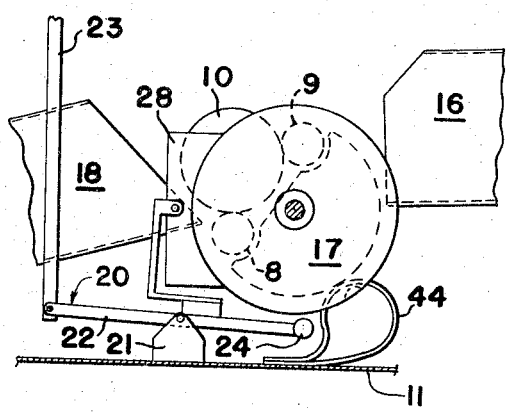
FIG. 4 is an elevation view, similar to FIG. 2, showing a round object being conveyed out of heating position.

The shaft 31 serves as a drive shaft through a suitable gear arrangement described below for the rotation of the support rods 8 and 9; and as a pivot shaft for the rotation of the carrier as indicated in FIGS. 2, 3, and 4. The rotating carrier 17 picks up the material to be heated at the chute 16 and moves it laterally into the high frequency field at which point the carrier stops its rotation. However, the rotating support rods 8 and 9 continue their rotation causing the preform 10 to continuously rotate while it is in the heating field. After the material is heated the carrier 17 is actuated to resume its rotation, moving the now heated preform 10 laterally out of the field and into the chute 18 as illustrated in FIG. 4.

Figure 6:
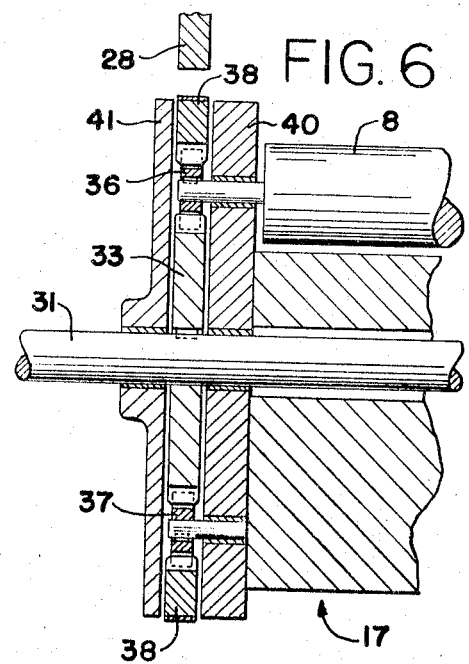
FIG. 6 is a sectional view taken along line 6—6 of FIG. 2 showing details of the roller and carrier drive structure.
Figure 7:
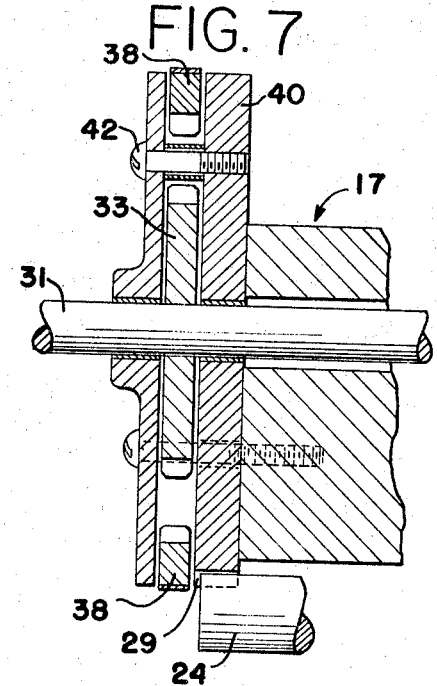
FIG. 7 is a sectional view taken along the line 7—7 of FIG. 2 showing details of the gears and the clutch structure.

The shaft 31 is driven by means including a suitable motor 46 and a coupling 30, and is supported by a mounting base 32, as shown in FIG. 5. The shaft 31 drives a plurality of gears, including a pinion gear 33, spur gears 35 and 36 mounted on the rollers 9 and 8, respectively, and another balancing spur gear 37 as best shown in FIGS. 6 and 7. The gear arrangement further includes a ring gear 38 having teeth on its inner periphery in engagement with the teeth of spur gears 35, 36, and 37. The ring gear 38 is mounted between plates 40 and 41 fastened together by screws 42 as shown in FIG. 7.

Means comprising a clutch 20 are provided for selectively controlling the gears to either rotate the rollers 8 and 9 during the heating cycle with carrier 17 locked in position as shown in FIG. 2, or to rotate carrier 17 to move the dielectric objects laterally with respect to the electrodes. The clutch 20 includes a pivot 21 for pivoting an arm 22, an arm 23 connected to it controlled by an electrically energizable solenoid coil 25, and a bar 24 for engaging detent means comprising a notch 29 on the exterior surface of the plate 40. The clutch 20 further includes a brake member 28 for engaging ring gear 38 to brake its rotation.

In the illustrated preferred embodiment the rotating support rods 8 and 9 are of a conducting material such as chrome plated steel and are disposed between the high and low voltage electrodes 12 and 11, respectively, with the rods 8 and 9 electrically connected to the low voltage or ground electrode 11 by means of the ground strap 44. However, the rotating support rods may be of a conducting material connected into the high frequency circuit to function as the electrodes in the circuit, with one or more of the rotating rods functioning as the high voltage electrode with the other rod or rods being low or ground voltage electrode. The support rods may also be of a conducting material and be connected in the high frequency circuit to serve as either the high voltage or the low voltage electrodes in the circuit, preferably the low voltage or ground electrode. The support rods may also be of a conducting material and covered with an insulating material such as Teflon (E. I. du Pont & Company trade name for polytetrafluoroethylene), and function in substantially the same manner as the support rods made of a conducting material described above. Another possible arrangement is for the support rods to be of a suitable non-conducting material such as a glazed ceramic insulator, and placed between the high and low voltage electrodes of the high frequency system.

Referring now to the mode of operation of the invention, cylindrical plastic preforms 10 are fed from a suitable supply means, not shown, into the heating zone between the electrodes 11 and 12 via the inclined chute 16 which is sized such that the preform 10 can only pass through it while it is rotating on its edge and with its axis oriented parallel to the electrodes. At this instant the carrier 17 is in the position shown in FIG. 3. Due to the inclination of chute 16, the preform 10 rolls on to the carrier 17 where it rests between rollers 8 and 9. The clutch bar 24 is out of engagement with the gear plate 40 as indicated in FIG. 3. Therefore, the carrier 17 continues to rotate until it is in heating position whereupon bar 24 is received in the groove 29 in plate 40, which serves as a detent means to locate the dielectric load directly between the electrodes 11 and 12 so that it may be heated by the high frequency field between them. The system is then as shown in FIG. 2 with the bar 24 in engagement with the notch 29 whereby the plate 40 and carrier 17 are locked against movement. However, the continuing rotation of the pinion gear 33 by shaft 31 drives the spur gears 35, 36, and 37 and thereby the rollers 8 and 9, continuously rotating the cylindrical preform 10. During this portion of the operation the axis of preform 10 continues to remain oriented parallel to the electrodes. Due to the continuous rotation of the preform 10 while it is in the heating field, all parts of it are quickly and uniformly heated to the predetermined desired temperature at, which time the heating cycle comes to an end. The solenoid 25 is thereupon actuated to disengage the clutch 20, releasing the bar 24 from notch 29. This results in the carrier 17 rotating in counter-clockwise direction until it reaches the position shown in FIG. 4 at which point the preform 10 is free to enter the chute 18 for transfer to the next operation, for example, a molding operation. The carrier 17 has been distinguished from the electrode 11 throughout for clarity. However, as the carrier 17 and the rollers 8 and 9 thereon are grounded by strap 44, and as the field in the illustrated embodiment is between electrode 12 and the carrier 17, the carrier 17 including rollers 8 and 9 may also be considered as the ground electrode.

The structure described above provides improved means for automatically placing cylindrical form dielectric material to be heated into the high frequency field in the desired orientation for optimum heating, continuously rotates the material while it is subjected to the heating field whereby it achieves a more uniform heating of material than available by previously known structure, and then automatically conveys the material away from the high frequency field after completion of the heating cycle.

The illustrated preferred embodiment of the invention employs two rollers for supporting the peripheral edge of the preforms. However, it will be recognized by those skilled in this art that in certain applications more than two rollers may be preferred because of the particular diameter of the round object being heated, or to provide more electrode area where the rollers are serving as electrodes, or for other reasons. Therefore, it will be understood that at least two or more rollers are intended wherever the expression "pair of rollers" appears in the above description and the appended claims.

While there has been described what is at present considered to be the preferred embodiment of the invention, it will be understood that various modifications may be made therein and are intended to be included within the scope of the appended claims.

What is claimed is:

1. In a high frequency dielectric heating system for heating round dielectric objects, the combination comprising, electrode means for establishing a high frequency heating field; carrier means including a carrier member; a pair of spaced rollers mounted on said carrier member for supporting and rotating round objects; and gear means for moving said round dielectric objects with respect to said electrode means, said gear means comprising a pinion gear, spur gear means mounted on at least one of said rollers in driving relation with said pinion gear, an internal ring gear in engagement with said spur gear means; means operable sequentially to hold and to release said ring gear, and synchronously therewith to hold and to release said carrier member, said rollers being free to rotate dielectric objects about their axes in the heating field when said ring gear is held, and said carrier moving said dielectric objects laterally with respect to said electrodes means when said ring gear is released.

2. In a high frequency dielectric heating system for heating round dielectric objects, the combination comprising electrode means for establishing a high frequency heating field; a mounting base structure; a driving shaft rotatably mounted on said base structure; a carrier member rotatably mounted on said driving shaft and positioned at least partially within said field, said carrier member including spaced end portions interconnected by a central portion, one of said end portions being provided with a peripheral notch forming a detent; a pair of spaced rollers rotatably mounted on said carrier member between said end portions for supporting and rotating round objects; gear means for moving said round dielectric objects with respect to said electrode means, said gear means including a pinion gear secured to said shaft, spur gear means mounted on at least one of said rollers in driving relation with said pinion gear, and an internal ring gear in engagement with said spur gear means; and brake means for sequentially and synchronously holding and releasing said ring gear and said carrier member, said brake means including means engageable with said detent to stop said carrier in a position wherein said round objects are within said field.

3. The combination as set forth in claim 2 above and additionally including means for rotating said shaft.

4. In a high frequency dielectric heating system for heating round dielectric objects, the combination comprising electrode means for establishing a high frequency heating field; a mounting base structure; a driving shaft rotatably mounted on said base structure; a carrier member rotatably mounted on said driving shaft and positioned at least partially within said field, said carrier member including spaced end portions interconnected by a central portion; a pair of spaced rollers rotatably mounted on said carrier member between said end portions for supporting and rotating round objects; gear means for moving said round dielectric objects with respect to said electrode means, said gear means including a pinion gear secured to said shaft, spur gear means mounted on at least one of said rollers in driving relation with said pinion gear, and an internal ring gear in engagement with said spur gear means; and brake means for sequentially and synchronously holding and releasing said ring gear and said carrier member.

5. In a high frequency dielectric heating system for heating round dielectric objects, the combination comprising electrode means for establishing a high frequency heating field; a mounting base structure; a driving shaft rotatably mounted on said base structure; a carrier member rotatably mounted on said driving shaft and positioned at least partially within said field, said carrier member including spaced end portions interconnected by a central portion, one of said end portions being provided with a peripheral notch forming a detent; a pair of spaced rollers rotatably mounted on said carrier member between said end portions for supporting and rotating round objects; gear means for moving said round dielectric objects with respect to said electrode means, said gear means including a pinion gear secured to said shaft, spur gears, one of said spur gears mounted on each of said rollers in driving relation with said pinion gear, an additional one of said spur gears being mounted on said carrier member, and an internal ring gear in engagement with said spur gears; and brake means for sequentially and synchronously holding and releasing said ring gear and said carrier member, said brake means including means engageable within said detent to stop said carrier in a position wherein said round objects are within said field.

6. In a high frequency dielectric heating system for heating round dielectric objects, the combination comprising electrode means for establishing a high frequency heating field, rotating means including a pair of rollers for supporting the round dielectric objects on their edge and continuously rotating the round dielectric objects about their axes while they are undergoing a high frequency heating cycle, moving means for moving said pair of rollers laterally with respect to the electrode means, drive means for said moving means and said rotating means, and means selectively operable for actuating said drive means for moving said pair of rollers laterally into and out of the heating field.

References Cited by the Examiner
UNITED STATES PATENTS

| | | | |
|---|---|---|---|
| 2,417,678 | 3/1947 | Cox | 219—10.73 X |
| 2,421,334 | 5/1947 | Kline et al. | 219—10.69 |
| 2,779,848 | 1/1957 | Bosomworth | 219—10.69 |
| 2,911,510 | 11/1959 | McNulty | 219—10.71 X |

ANTHONY BARTIS, *Primary Examiner.*

RICHARD M. WOOD, *Examiner.*

L. H. BENDER, *Assistant Examiner.*